United States Patent [19]

Braun et al.

[11] 4,126,470

[45] Nov. 21, 1978

[54] LIGHT CONCRETE AND METHOD OF PREPARING THE SAME

[75] Inventors: Hans-Rüdiger Braun, Palling; Hans-Günter Rosenbauer, Trostberg, both of Germany; André Coin, Paris; Roland Davril, Maurepas, both of France

[73] Assignees: Suddeutsche Kalkstickstoff-Werke Aktiengesellschaft, Trostberg, Germany; Societe Auxiliaire d'Entreprises, Paris, France

[21] Appl. No.: 832,667

[22] Filed: Sep. 12, 1977

[30] Foreign Application Priority Data

Sep. 21, 1976 [FR] France .................. 76 28332

[51] Int. Cl.² .............................................. C04B 7/35
[52] U.S. Cl. ........................................ 106/95; 106/97
[58] Field of Search ................ 106/95, 97, 314

[56] References Cited

U.S. PATENT DOCUMENTS 3,972,723  8/1976  Balle et al. ............................ 106/97

*Primary Examiner*—James Poer
*Attorney, Agent, or Firm*—Hans Berman

[57] ABSTRACT

A light concrete prepared from a mixture of Portland cement, cellular aggregate, and an admixture including a melamine-formaldehyde condensate carrying sulfo groups for reducing the need for mixing water, an alkaline earth metal stearate as a water repelling material, and polyethyleneglycol has greater mechanical strength at lower density than an otherwise identical concrete containing only two ingredients of the admixture.

14 Claims, No Drawings

LIGHT CONCRETE AND METHOD OF PREPARING THE SAME

This invention relates to light concrete having low thermal conductivity, and particularly to a concrete combining such low conductivity with good mechanical strength, and to a method of making such concrete.

The advantages of light concrete are too well known to require detailed description. However, concrete including light or cellular aggregate to reduce the density of the cured concrete has normally low mechanical strength and tends to absorb water. The aggregate absorbs water from the mixture and thereby unduly reduces the time during which the mixture may be worked, but increases the time required for adequate curing. Moreover, conventional light concrete prepared from aggregate of mixed particle size tends to be non-homogeneous, the larger and lighter particles tending to rise, the fines tending to settle out during compacting.

The need for large amounts of mixing water in light concrete and the resulting slow curing may be remedied in a known manner by admixture of agents which reduce the amount of mixing water required for plastifying and curing the cement. However, such agents enhance the tendency for segregation of the several aggregate fractions by reducing the viscosity of the concrete mixture.

The water absorption of the cured concrete can be reduced by known admixtures containing water repelling materials. However, such materials do not reduce the segregation problem inherent in conventional light concrete.

The primary object of this invention is the provision of a light concrete which is more homogeneous, and therefore mechanically stronger than otherwise comparable known concrete.

It has been found that the fines in the aggregate cluster firmly about the coarser particles, and retain their uniform distribution even during compacting of the concrete mixture if the concrete mixture essentially consists per cubic meter of poured concrete, of 1100 to 1400 liters cellular aggregate, 200 to 350 kg Portland cement, 70 to 175 kg. mixing water, and 1.5 to 5%, based on the weight of the cement, of an admixture including an agent capable of reducing the amount of the mixing water required for making the mixture fluid and curing the cement, a water repelling material, and a polyalkyleneglycol.

The cellular aggregate employed in the concrete mixture of the invention may be conventional in itself. Naturally occurring minerals as well as man-made inorganic and organic materials have been used heretofore. The naturally occurring minerals include pumice, lava, tufa, diatomaceous earth. Expanded minerals suitable for this invention include slate or shale and obsidian. Man-made light aggregates that may be employed include blast furnace slag, vermiculite, perlite, calcium silicate, cellular glass, and foamed plastics such as polystyrene or polyurethanes. A light aggregate which has been found particularly advantageous consists of the following fractions of cellular or burned material in the total 1100 to 1400 liters mentioned above:

100 to 150 liters cellular argilaceous sand having a particle size of less than 2 mm and a density of 0.70 to 0.78;
250 to 300 liters cellular clay having a grain size of 1 to 3 mm and a density of 0.62 to 0.75;
180 to 250 liters cellular clay having a grain size between 4 and 10 mm and a density of 0.47 to 0.55;
600 to 700 liters cellular shale having a grain size from 5 to 10 mm and a density of 0.38 to 0.45.

The critical component in the concrete mixture of the invention is the multi-component admixture. The water reducing agent or agents may be of one or more known types. Naphtholformaldehyde and phenol formaldehyde condensates having sulfo groups have been used for the purpose, certain molecular weights and sulfo group contents being preferred. Lignosulfonates and combinations of sugar acids and amino acids also have been proposed. The preferred agents for reducing the need for mixing water are the melamine-formaldehyde condensates containing sulfo groups which facilitate working of the concrete mixture.

Water repelling materials have been used heretofore in concrete. The known, suitable agents include paraffin oils, waxes, resins, rosin, naturally occurring fatty acids, and synthetically produced monocarboxylic acids derived from straight-chained and branched hydrocarbons having 5 to 20 carbon atoms. The preferred water-repelling materials are the zinc salts, but particularly the alkaline earth metal salts of stearic, palmitic, lauric, caprinic, caproic, and oleic acid, especially the magnesium and calcium salts. Certain silicones may equally be employed.

The polyalkyleneglycol component in the admixtures of the invention preferably is a polyethyleneglycol having a molecular weight of 100,000 to beyond 5 millions. The best products tested so far have a viscosity of approximately 50 to 150 cp in aqueous 0.3% solution at 25° C., and a viscosity of about 2,500 to 3,500 cp in 1% solution.

To permit a uniform distribution of the relatively small amount of admixture in the aggregate and Portland cement of the concrete mixtures of the invention, a pulverulent mineral carrier is preferably employed. Finely ground calcium carbonate, calcium hydroxide, dolomite, silica, silicates, and clays are suitable, but Portland cement is equally effective and preferred.

The weight relationship of the several ingredients in a preferred admixture of the invention which produces concrete of low thermal conductivity combined with high mechanical strength is preferably maintained within the following limits:

10 to 40 parts water reducing agent;
10 to 40 parts water repelling material;
25 to 100 parts pulverulent mineral carrier; and
0.5 to 5 parts polyalkyleneglycol.

The admixture should amount to 1.5% to 5% of the weight of the cement in the concrete mixture. Best results are usually obtained with 2 to 3% admixture.

In preparing the concrete mixture, the multi-component admixture is prepared first and is then intimately mixed with the Portland cement and the light aggregate in the practically complete absence of water. The mixing water is added last in a ratio of 0.30 : 1 to 0.50 : 1, and preferably between 0.34 : 1 and 0.40 : 1, relative to the Portland cement. Portland cement of type PZ 350 F is merely typical of the grades useful in this invention. To make one cubic meter of compacted and installed concrete, 250 to 300 kg Portland cement are combined with the aggregate which should consist of particles differing in grain size by a factor of at least ten.

The admixture described above has been found to cause the fines in the aggregate to arrange themselves about the coarser aggregate particles. It is not necessary to moisten the aggregate before it is added to the other ingredients of the concrete mixture. Because of this fact, the concrete ultimately produced is low in density and shows a homogeneous distribution of the several aggregate fractions of different particle size. The several ingredients of the admixture synergistically cooperate to assist in the formation of a light-weight concrete which shows good thermal insulating properties, is homogeneous, hardens relatively fast so that forms may be removed at an early stage, and has high ultimate mechanical strength.

A light concrete prepared according to the invention reaches a density of 1 or less within seven days. The mechanical strength of the concrete of the invention after seven days is distinctly superior to that of an otherwise idential concrete containing only a water repelling material as an admixture.

The fluid concrete mixture prepared according to the invention is distinctly thixotropic. The poured concrete is rigid enough that it will not spontaneously run down over a slightly inclined surface. Yet, it remains readily workable and capable of being poured over a period of more than one hour.

The advantages of the invention will be evident from the comparison tests described in the following Example.

EXAMPLE

Four batches of concrete mixture were prepared in an identical manner as far as not specifically described otherwise in a mixer having a vertical axis and a stirrer rotating at 350 RPM. 1290 Liters cellular aggregate was mixed for 30 seconds with 280 kg Portland cement (CPA, Class 400) and with the admixture described below, if any. Thereafter, enough mixing water was added to impart to the mass the necessary plasticity or fluidity for further processing within two minutes of further mixing.

The aggregate employed had the following composition:

100 liters expanded argilaceous sand having a grain size of less than 2 mm;
300 liters expanded clay having a sieve analysis of 1 to 3 mm;
240 liters expanded clay having a sieve analysis of 4 to 10 mm;
650 liters expanded shale having a sieve analysis of 5 to 10 mm.

Each batch of concrete mixture was poured and compacted in a conventional manner.

Batch No. 1 was prepared without admixture.

Batch No. 2 contained 7 kg of an admixture consisting of 1.4 kg melamine-formaldehyde condensate having available sulfo groups, as described in German Pat. No. 2,359,291, and 0.035 kg polyethyleneglycol having a viscosity of 100 cp in 0.3% aqueous solution at 25° C., the balance of 5.565 kg being Portland cement as a pulverulent, mineral carrier.

Batch No. 3 contained 7 kg of an admixture consisting of 1.4 kg melamine-formaldehyde condensate having sulfo groups, as in Batch No. 2, 2.24 kg calcium stearate, and 3.56 kg Portland cement.

Batch No. 4 contained 7 kg of an admixture consisting of 1.4 kg melamine-formaldehyde condensate having sulfo groups, 2.24 kg calcium stearate, 0.035 kg polyethylene plycol as in Batch No. 2, and 3.325 kg Portland cement.

The amount of water required to produce the desired fluidity or plasticity was significantly lower in Batch No. 4, a concrete mixture according to this invention, than for Batches Nos. 1 to 3 which did not contain all the ingredients of the admixture of Batch No. 4. This is shown in the first line of the attached Table. This reduction in the need for mixing water was achieved without increasing the amount of the melamine-formaldehyde condensate bearing sulfo groups. The simultaneously present other ingredients, not known in themselves to reduce the need for mixing water, synergistically enhance the effect of the condensate.

The compressive strength of the concrete obtained by curing of the mixture of Batch No. 4 was higher after the first 7 and 28 days of the curing process than that of any one of Batches Nos. 1 to 3, and a similar relationship was found for the flexural strength after 1, 7, and 28 days. These higher strength values were achieved although the density of the concrete obtained from the concrete mixture of the invention was lower than that of the control batches. The coefficient of thermal conductivity was inversely related to the density as was to be expected.

When cured concrete prepared from the four batches was stored under water for 28 days, the concrete prepared from the mixture of the invention absorbed less than 5% moisture or about as much as Batch No. 3 although it contained polyethyleneglycol.

Examination of samples of cured concrete revealed most segregation of fine and coarse fractions of the aggregate in the concrete of Batch No. 1, less in Batch No. 3, least of the control batches in No. 2, but none in the concrete prepared from the mixture of the invention.

TABLE

| | Batch No. | | | |
|---|---|---|---|---|
| | 1 | 2 | 3 | 4 |
| Necessary mixing water, liters | 145 | 121 | 121 | 101 |
| Working time, minutes | 60 | 75 | 40 | 75 |
| Compressive strength (bars) | | | | |
| after 7 days | 97 | 107 | 98 | 120 |
| after 28 days | 94 | 109 | 100 | 170 |
| Flexural strength (bars) | | | | |
| after 24 hours | 10 | 9 | 8 | 20 |
| after 7 days | 16 | 18 | 17 | 24 |
| after 28 days | 20 | 22 | 21 | 30 |
| Density (kg/dm$^3$) | | | | |
| after 7 days | 1.03 | 1.02 | 1.03 | 0.93 |
| after 28 days | 1.02 | 1.02 | 1.02 | 0.89 |
| Coefficient of thermal conductivity (W/m$^2$) | 0.32 | 0.33 | 0.32 | 0.24 |
| Water absorption (28 days under water) | >15% | >10% | <5% | <5% |

What is claimed is:

1. A pourable concrete mixture consisting essentially, per cubic meter, of 100 to 1400 liters cellular aggregate, 200 to 350 kg Portland cement, 70 to 175 kg mixing water, and an admixture in an amount of 1.5% to 5% of the weight of said cement, said admixture including a water repellent material, a polyalkyleneglycol, and an agent capable of reducing the amount of said mixing water required for making said mixture fluid and for curing said cement, said agent being a naphthol formaldehyde condensate having sulfo groups, a phenol formaldehyde condensate having sulfo groups, a lignosulfonate, a combination of a sugar acid and an amino acid, or a melamine-formaldehyde condensate containing sulfo groups.

2. A mixture as set forth in claim 1, wherein said admixture consists essentially of 10 to 40 parts of said agent, 10 to 40 parts of said material, 0.5 to 5 parts of said polyalkyleneglycol, and 25 to 100 parts of a pulverulent mineral carrier, said parts being by weight.

3. A mixture as set forth in claim 2, wherein said aggregate is a granular material varying in grain size over a range of at least 1 : 10.

4. A mixture as set forth in claim 3, wherein said granular material is an expanded, naturally occurring mineral.

5. A mixture as set forth in claim 2, wherein said aggregate consists essentially of 100 to 150 expanded argilaceous sand having a particle size of less than 2 mm and a density of 0.70 to 0.78, 250 to 300 parts expanded clay having a grain size of 1 to 3 mm and a density of 0.62 to 0.75, 180 to 250 parts expanded clay having a grain size of 4 to 10 mm and a density of 0.47 to 0.55, and 600 to 700 parts expanded shale having a grain size of 5 to 10 mm and a density of 0.38 to 0.45, said parts of said aggregate being by volume.

6. A mixture as set forth in claim 2, wherein said agent is a melamine-formaldehyde condensate having free sulfo groups, and said polyalkyleneglycol is polyethyleneglycol having a molecular weight of at least 100,000.

7. A mixture as set forth in claim 6, wherein said polyethyleneglycol has a viscosity of 50 to 150 cp in 0.3% aqueous solution at 25° C.

8. A mixture as set forth in claim 6, wherein said material is a stearate of an alkaline earth metal or of zinc.

9. A mixture as set forth in claim 8, wherein the amount of said admixture is between 2% and 3% of the weight of said cement.

10. A mixture as set forth in claim 2, wherein said carrier is Portland cement.

11. A solid body of concrete prepared by permitting the mixture set forth in claim 1 to cure.

12. A method as set forth in claim 1, wherein the weight ratio of said mixing water to said cement is between 0.30 : 1 and 0.50 : 1.

13. A method as set forth in claim 12, wherein said ratio is between 0.34 : 1 and 0.40 : 1.

14. A method of preparing a pourable concrete mixture consisting essentially, per cubic meter, of 100 to 1400 liters cellular aggregate, 200 to 350 kg Portland cement, 70 to 175 kg mixing water, and an admixture in an amount of 1.5% to 5% of the weight of said cement, said admixture including a water repellent material, a polyalkyleneglycol, and an agent capable of reducing the amount of said mixing water required for making said mixture fluid and for curing said cement, said agent being a napthtol formaldehyde condensate having sulfo groups, a phenol formaldehyde condensate having sulfo groups, a lignosulfonate, a combination of a sugar acid and an amino acid, or a melamine formaldehyde condensate containing sulfo groups, which method comprises:
 (a) intimately mixing said aggregate, said cement, and said admixture in the substantial absence of water; and
 (b) thereafter combining said mixing water with the intimately mixed aggregate, cement, and admixture.

* * * * *